United States Patent [19]
Arosio

[11] Patent Number: 5,873,386
[45] Date of Patent: Feb. 23, 1999

[54] QUICK-RELEASE COUPLING

[75] Inventor: Massimo Arosio, Rivolta d'Adda, Italy

[73] Assignee: Faster S.r.L., Melzo, Italy

[21] Appl. No.: 881,657

[22] Filed: Jun. 24, 1997

[30] Foreign Application Priority Data

Feb. 21, 1997 [IT] Italy .................................. MI97A0371

[51] Int. Cl.⁶ .................................................. F16L 37/28
[52] U.S. Cl. ...................................... 137/614.02; 285/316
[58] Field of Search .......................... 137/614.02, 614.03, 137/614.04, 614.05; 285/316

[56] References Cited

U.S. PATENT DOCUMENTS

| | | | |
|---|---|---|---|
| 4,388,947 | 6/1983 | Steuerwald | 137/614.05 X |
| 4,924,909 | 5/1990 | Wilcox | 137/614.05 |
| 5,076,325 | 12/1991 | Ekman | 137/614.03 |
| 5,323,812 | 6/1994 | Wayne | 137/614.03 X |

*Primary Examiner*—Kevin Lee
*Attorney, Agent, or Firm*—Kirschstein et al.

[57] ABSTRACT

A quick-release coupling includes a male part and a female part. The female part has a valve stem attached to an inner tubular body so as to define a number of flow channels, and an outer body that houses a pair of sliders. The female part also has an intermediate sleeve that slides inside the outer body and is attached to the inner tubular body. The outer body has an inner stop shoulder which defines an extended position of the sleeve. A sealing device, movable by the pressure of a fluid present in the female part, is present at the rear between the sleeve and the outer body. The sleeve is stressed from the rear by a pressure spring. The outer body is locked to and released from the sleeve.

10 Claims, 4 Drawing Sheets

QUICK-RELEASE COUPLING

BACKGROUND OF THE INVENTION

The invention relates to a quick-release coupling comprising a male part and a female part, where the female part is composed of a valve stem attached to an inner tubular body so as to define a number of flow channels and an outer body that houses sliders and means of locking and releasing the male part.

it is known that special quick-release connectors or couplings are used to enable a flexible hose to be connected and disconnected swiftly to and from a hydraulic system. Certain quick-release couplings in particular have no projections on their mutually opposing surfaces and are termed flat-faced quick-release couplings. These couplings prevent the ingress of air or the leakage of fluid during connection and disconnection.

Flat-faced quick-release couplings currently consist of a male part and a female part. The male part comprises an outer body and a valve body of standardized geometry and dimensions.

The female part comprises a valve stem fixed by a valve guide to an inner body. The inner body is fixed in turn to an outer body. The valve guide supports the valve stem in the centre of the coupling and defines flow channels for the fluid. An inner slider and an outer slider move internally inside the outer body under the action of springs. The movement of the sliders opens and closes the fluid flow channels. A ring of balls is present in special seats formed in the outer body close to the end that couples onto the male part. A sliding collar subject to spring action is provided around the outside of the body and encloses the ring of balls. The collar locks or releases the ring of balls when pushed into a recess in the male part when the coupling is connected up.

The two parts of the coupling are connected together by pushing the male part against the valve stem and sliders of the female part.

While being pressed against the valve stem of the female part, the valve of the male part retreats inside the male part, thereby opening the fluid flow channels.

These flat-faced quick-release couplings are used as connectors in hydraulic circuits, e.g. in hydraulic circuits for agricultural machinery or earth levelling machines. They are used especially for connecting the hydraulic circuit of a tool to the power unit.

The hydraulic circuit of the tool usually ends at the male part of the coupling.

It often happens that the hydraulic circuit is disconnected, by opening the coupling, while still partially under pressure. In such cases, the male part contains fluid under pressure which makes subsequent reconnection of the coupling very difficult, as the amount of force required for this operation is equivalent to the cross-sectional area of the valve of the male part (cross-sectional area of the coupling equal to the external dimension of a seal of the valve), whose dimensions are sometimes very great, multiplied by the pressure of the internal fluid.

It may also happen that after the hydraulic circuit of a tool has been disconnected from a power unit at a given atmospheric temperature, the fluid remaining inside the tool's hydraulic circuit increases in pressure with a rise in the temperature of the atmosphere.

Tools do not usually include means of adjusting the pressure of the hydraulic circuit and so it is extremely difficult to reconnect the hydraulic circuit of the tool to the power unit. The reason for this is the extreme difficulty of driving back the valve present inside the male part when it is under pressure from the heated fluid contained inside it.

SUMMARY OF THE INVENTION

It is an object of the present invention to solve the problems of the prior art and enable flat-faced quick-release couplings to be connected together even if there is fluid under pressure inside the male part.

The object is achieved with a quick-release coupling comprising a male part and a female part, where the female part is composed of a valve stem attached to an inner tubular body so as to define a number of flow channels and an outer body that houses sliders and means of locking and releasing the male part, which coupling is characterized in that the female part has an intermediate sleeve that slides inside the outer body and is attached to the inner tubular body, in that the outer body has an inner stop shoulder which defines the extended position of the sleeve, in that a sealing device forming a cross-section of thrust influenced by the pressure of a fluid present in the female part, is present at the rear between the sleeve and the outer body, in that the sleeve is stressed from the rear by a pressure spring and in that the outer body has means for locking and releasing the sleeve.

In order to lock and release the sleeve when it is in abutment against the outer body, the sleeve has on its outer surface a circumferential groove, the outer body has, in a position corresponding to the groove of the sleeve, a plurality of radial through holes which movably house a ring of balls, around the outside of the outer body is a slidable rear collar enclosing the ring of balls with an internal circumferential groove, the rear collar is stressed by a thrust spring acting from the rear and an extension of the front collar acts as a stop shoulder for the rear collar.

In order that the rear collar can push the ring of balls towards the groove of the sleeve, when lined up with the holes of the front outer body, the internal circumferential groove of the rear collar is of trapezial cross-section.

In order to enable the sleeve to be released, the circumferential groove on the sleeve forms an arc of a circle in cross-section and the depth of the groove is less than the diameter of the balls.

In order to make possible the thrust action of the spring of the rear collar, the front outer body has near its rear end a bearing shoulder for the spring of the rear collar.

In order to provide rear annular action surfaces in the sleeve, the sleeve has at its rear a tubular extension which slides inside the rear outer body.

In order to allow the spring of the sleeve to act, the sleeve has an inner thrust shoulder for the spring.

In order to prevent leaks between the sleeve and the outer body, the upper surface of the rear end of the sleeve contains a circumferential groove housing an O-ring seal.

In order to provide a bearing surface for the thrust spring of the sleeve, the rear outer body has an inner thrust shoulder for the spring of the sleeve.

To allow better packing of the sliders during the opening of the valve, the sleeve has an inner thrust shoulder near its front end for a spring for the outer slider.

The main advantages of the invention may be seen in the fact that the sliding valve stem, present in the female part of the coupling, enables the male part to be connected mechanically without the valves opening and therefore without overcoming the resistance offered by the pressurized fluid present in the male part. Only when the male part is connected up does a controlled increase in the pressure of the fluid present in the hydraulic circuit ending at the female part open the valves and allow the fluid to flow through the coupling. The valves are opened by the movement of the sleeve caused by the action of the pressure of the fluid adjusted by, for example, a pump present in the hydraulic system.

It is also an advantage that it is possible to connect the female part to any male part, whether or not containing pressurized fluid, provided it has the standardized external coupling surfaces.

Another advantage is that the means of locking and releasing the intermediate sleeve come into action automatically when the male part 1 is connected up and the sleeve is in the extended position.

BRIEF DESCRIPTION OF THE DRAWINGS

The subject of the present invention will now be described in greater detail and illustrated in the form of one embodiment which is provided purely by way of an example in the attached drawings, in which.

DETAILED DESCRIPTION OF THE PREFERRED EMBODIMENT

Figure 1:
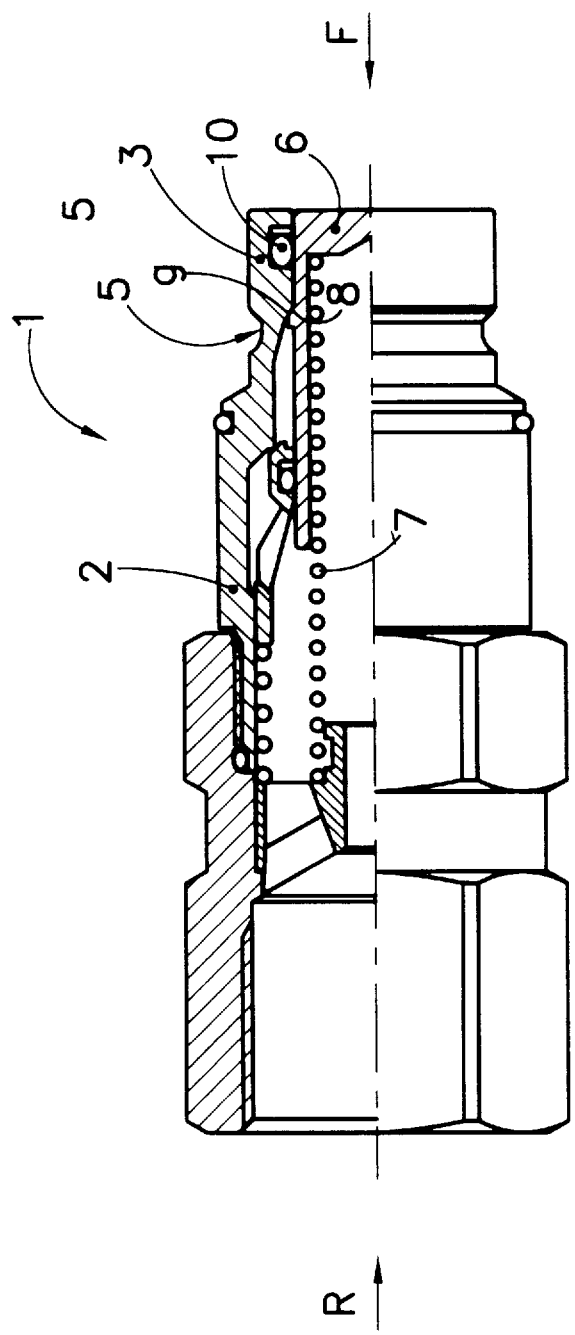
FIG. 1 is a partially sectioned side view of the male part of a flat-faced quick-release coupling.

Visible in FIG. 1 is a known male part, bearing the general reference 1, of a flat-faced quick-release coupling.

The male part 1 comprises a tubular body 2 having a front part (see arrow F) and a rear part (see arrow R). The front end 3 of the body 2 has an outer locking groove 5.

The body 2 houses a valve 6 able to slide longitudinally. The valve 6 is stressed by a spring 7.

The body 2 has an inner stop shoulder 9 near the front opening to define the extended position of the valve 6.

The valve 6, when in the extended position, completely closes the front mouth of the body 2.

Figure 2:
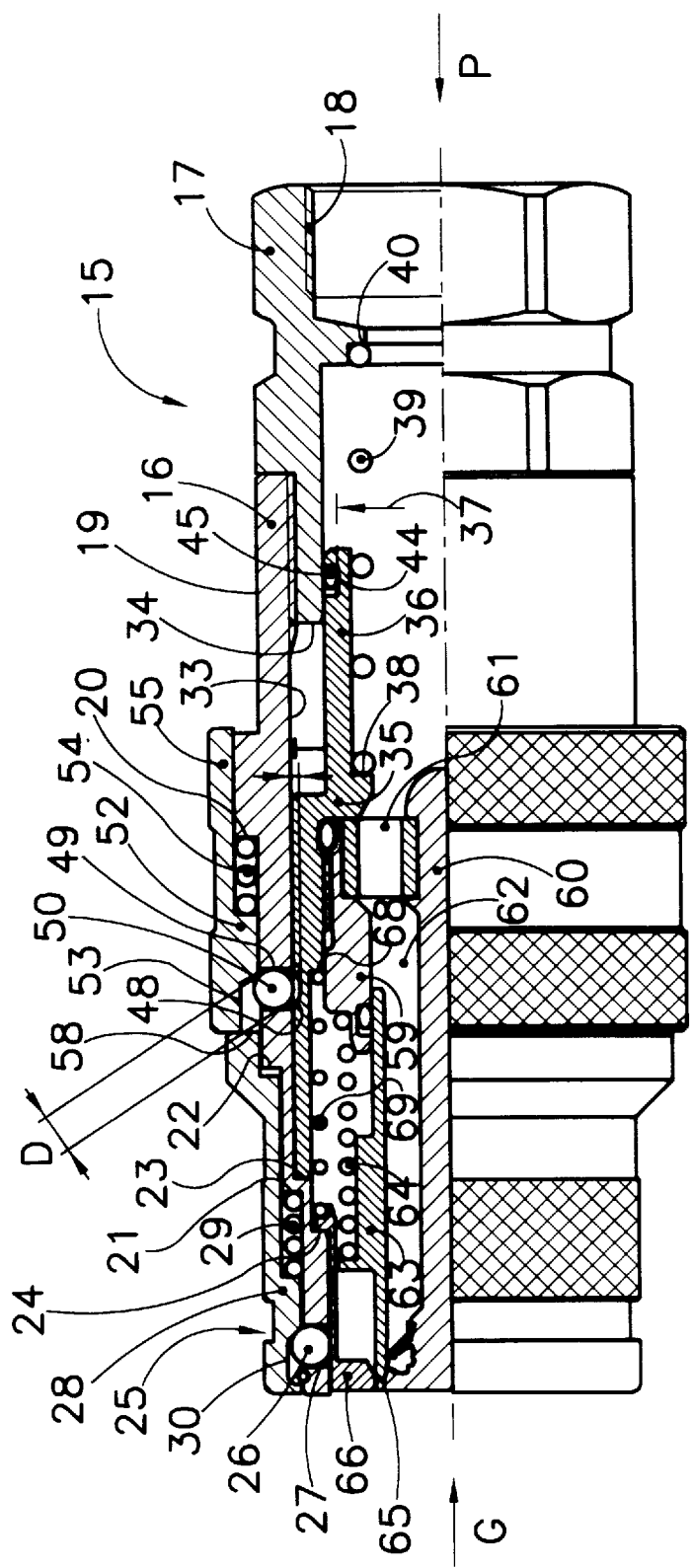
FIG. 2 is a partially sectioned side view of the female part of the quick-release coupling.

Visible in FIG. 2 is a female part, bearing the general reference 15, of the flat-faced quick-release coupling.

The female part comprises a front part (see arrow G) and a rear part (see arrow P).

A front outer body 16 is fixed to a rear outer body 17. The free end of the rear outer body has an inner thread 18 for connection to a hydraulic system (not shown).

The front body 16 has a stepped outer surface 19. The steps of the outer surface 19 form bearing shoulders 20, 21 and a stop shoulder 22.

The front body 16 has internal steps forming stop shoulders 23, 24.

Towards the free end of, and on the outside of, the front body 16 are known means for locking and releasing the male part 1 under the general reference 25.

The means 25 for locking and releasing the male part 1 comprise a ring 26 of balls housed in seats 27 in the body 16. The ring 26 of balls is enclosed externally by a front collar 28 stressed by a thrust spring 29 acting on the collar 28 from the rear.

The front collar 28 has an inner circumferential groove 30 to accommodate the ring 26 of balls.

The body 16 contains an inner cylindrical seat 33 facing to the rear. The front end of the seat 33 is represented by the stop shoulder 23. The rear end of the seat 33 is represented by the surface 34 on the front end of the rear outer body 17.

The seat 33 houses an intermediate sliding sleeve 35. On the rear of the sleeve 35 is a tubular extension 36 that slides inside the front end of the rear body 17.

The sleeve 35 has an inner thrust shoulder 38 for a spring 39.

The spring 39 of the sleeve 35 bears at the rear end against a shoulder 40 present on the inside of the rear outer body 17.

On the outside of the rear end of the extension 36 of the sleeve 35 is a sealing device defining a cross-section 37 influenced by the pressure of a fluid (not shown) inside the female part 15.

Advantageously, on the outside of the rear end of the extension 36 is a circumferential groove 44 housing a seal 45, such as for example an O-ring.

On the surface of the sleeve 35 that lies in contact with the cylindrical seat 33 is a circumferential groove 48. Advantageously, the groove 48 forms an arc of a circle in cross-section.

The front outer body 16 has a plurality of radial through holes 49 lined up with the groove 48 when the sleeve 35 is in abutment against the shoulder 23 (extended position).

The through holes 49 house a ring 50 of balls.

Around the through holes 49 on the outside of the front body 16 is a sliding rear collar 52.

The rear collar 52 has a circumferential inner groove 53 that houses the ring 50 of balls when the latter are pushed out of the groove 48 of the sleeve 35. The groove 53 is advantageously of trapezial cross-section.

The depth (T) of the groove 48 of the sleeve 35 is advantageously less than the diameter (D) of the balls 50.

The collar 52 is stressed from the rear by a thrust spring 54. The rear end of the spring 54 bears against the shoulder 20 of the front outer body 16.

A cylindrical extension 55 of the collar 52 encloses the spring 54 externally.

The rear surface 58 of the front collar 28 acts as a stop shoulder for the rear collar 52.

It will be clear to a person skilled in the art that in order to lock and release the sleeve 35 correctly, the groove 48 on the sleeve 35, when lined up with the holes 49 in the outer body 16, forms wells in which the balls of the ring 50 are completely housed, with the result that the collar 52 can be slid towards the front of the coupling, when not blocked by the front collar 28, and the through holes 49 closed.

The intermediate sleeve 35 is connected to a known inner tubular body 59. The inner body 59 supports a valve stem 60 in the centre of the female part 15 by means of a valve guide 61, thus defining flow channels 62 for the fluid.

Interposed between the inner body 59 and the valve step 60 is an inner slider 63 stressed by a spring 64 whose opposite end bears on the inner body 59.

The front end of the valve stem 60 includes a stop shoulder 65 for the inner slider 63.

Known sealing means are interposed between the slider 63 and the stem 60, and also between the slider 63 and the inner body 59.

An outer slider 66 is present on the inside of the free end of the front body 16.

The sleeve 35 has an inner bearing shoulder 68 near its front end for a thrust spring 69 for the outer slider 66.

The operation of the device will now be described with the aid of FIGS. 2, 3 and 4.

FIG. 2 shows the positions of the various movable components present in the female part 15 when the latter is disconnected from the male part 1.

Figure 3:
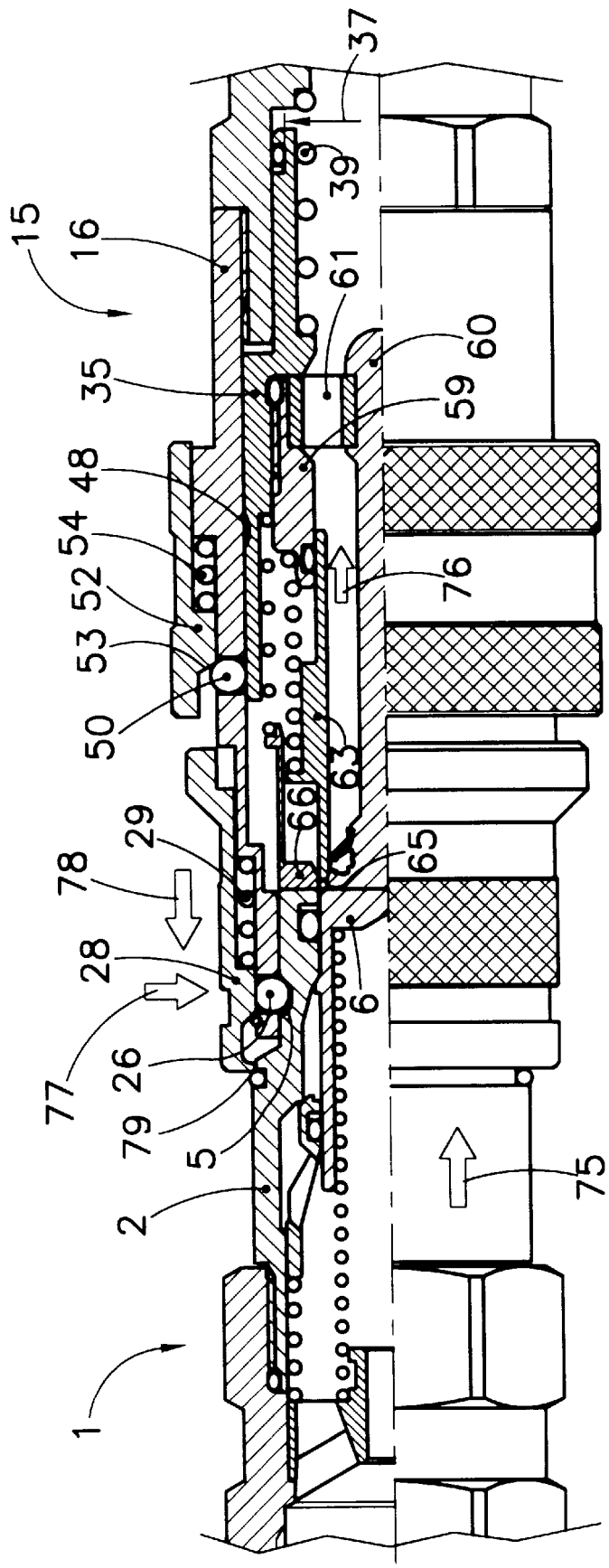
FIG. 3 is a partially sectioned side view of the coupling in the first stage of making the connection.

FIG. 3 shows the positions reached by the movable components at the conclusion of the mechanical connection of the male part 1, when the valves (the valve body 6 of the male part 1 and the inner 63 and outer 66 sliders) are still closed.

Figure 4:
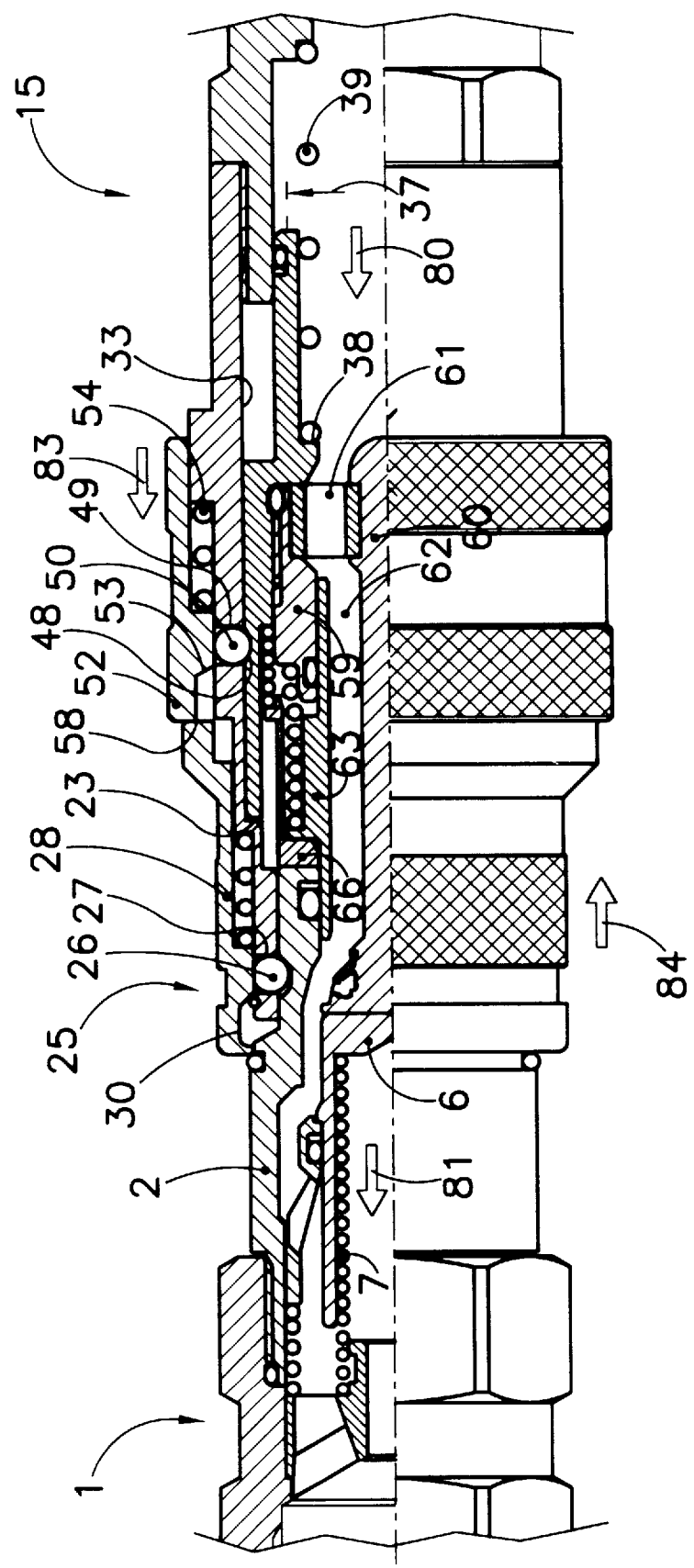
FIG. 4 is a partially sectioned side view of the coupling when connected up.

FIG. 4 shows the positions of the components with the coupling connected and the valves open.

When the coupling is disconnected the sleeve 35 of the female part 15 is in the extended position. Consequently the inner body 59 and the valve stem 60 are in the extended position.

The inner slider 63 bears against the shoulder 65 present on the valve stem 60 and the outer slider 66 bears against the shoulder 24 present on the outer body 16, in both cases owing to the action of the springs 64, 69.

In this position the outer slider 66 closes the bottoms of the through holes 27. The ring 26 of balls projecting from the outer body 16 keeps the front collar 28, which is stressed by the spring 29, in position.

The rear collar 52 is stressed by the spring 54 against the shoulder 58 of the front collar 28 and its groove 53 is lined up with the through holes 49 and with the groove 48 around the sleeve 35.

The sleeve 35 is kept in the extended position by the spring 39.

While the male part 1 is being connected up, the valve body 6, under the pressure of the internal fluid, remains closed in abutment against the outer body 2, with its frontmost surface flush with the frontmost surface of the outer body 2.

As the outer body 2 and the valve body 6 of the male part 1 are pushed against the outer slider 66 and the valve stem 60 of the female part 15, the valve stem 60 and sliders 66, 63 are driven back 76 and, via the valve guide 61 attached to the inner body 59, the intermediate sleeve 35 is driven back 76.

As the outer body 2 of the male part 1 passes into the outer body 16 of the female part 15, the ball ring 26 rolls along the outer surface of the body 2 before dropping into the groove 5. This releases the front collar 28. The collar 28, stressed by the spring 29, closes 77 the seats 27 so that the male part 1 is locked in position.

The front collar 28 bears against a shoulder 79 on the outside of the body 2 of the male part 1.

As the sleeve 35 slides back, it causes the ring 50 of balls to come out of the seat 48 and into the groove 53 of the rear collar 52 which, despite the forward movement of the front collar 28, is locked in the rearward position.

The inner slider 63 is still bearing against the shoulder 65 present on the valve stem 60, and so the fluid flow channels 62 are kept closed.

In this condition the male part 1 is integral with the female part 15 but the valves of both parts are still locked and no fluid can pass through.

Now that the male part 1 has been coupled by means of the locking means 25, it is possible to raise the pressure of the fluid in the hydraulic system of which the female part 15 is one branch. This is because the female part 15 of the quick-release coupling is usually connected to the power plant containing the pump of the hydraulic system (these parts are not shown). The action of the pressure of the fluid on the cross-section 37 determined by the O-ring seal 45 around the sleeve 35 creates a force 80 exerted by the valve stem 60 on the valve body 6 of the male part 1.

Once the reaction produced by the internal pressure of the fluid inside the male part 1 has been overcome, the sleeve 35 slides inside the seat 33 of the front body 16 in such a way as to cause the valve stem 60 to advance and the valve body 6 inside the male part 1 to retreat 81, until the sleeve 35 reaches the shoulder 23.

The outer body 2 of the male part 1 connected to the front body 16 of the female part 15 blocks the outer slider 66 while the slider 66 bears against the inner slider 63 and opens the fluid flow channels 62 of the coupling.

When the sleeve 35 reaches the shoulder 23, its groove 48 comes into line with the holes 49. The balls of the ring 50, pushed; by the inclined sides of the groove 53 present on the inside of the collar 52, drop 82 into the groove 49 and so lock the sleeve 35 in position.

The ring 50 of balls housed completely in the holes 49 releases the collar 52 which, under the action of the spring 54, slides forwards 83 until it meets the shoulder 58 of the front collar 28. In this way the inside surface of the collar 52 closes the tops of the holes 49 and prevents the balls of the ring 50 from coming out of the seat 49 of the sleeve 35.

In order to disconnect the coupling, all that is required is to push back 84 the collar 28 to bring the groove 30 in line with the seats 27.

The action of the pressurized fluid inside the male part 1, and the action of the spring 7 acting on the valve body 6, and also the springs 64, 69 of the sliders, expel the body 2 from the female part 15. The movement of expulsion of the body 2 from the female part 15 causes the inclined sides of the groove 27 to push the ring 26 of balls into the groove 30 of the front collar and so release the male part 1.

Under the action of the spring 7, the valve body 6 of the male part 1 closes the male part 1 during the expulsion.

The expulsion of the body 2 from the male part 1 allows the sliders 63, 66 to extend under the action of the springs 64, 69. The sliders 63, 66 close the fluid flow channels 62 through the female part 15.

I claim:

1. A quick-release coupling, comprising: a male part and a female part, the female part having a valve stem attached to an inner tubular body so as to define a number of flow channels, a hollow outer body that houses an outer slider and an inner slider, means for locking and releasing the male part, an intermediate sleeve that slides inside the outer body and is attached to the inner tubular body, the outer body having an inner stop shoulder which defines an extended position of the sleeve, a sealing device movable by a pressurized fluid present in the female part, the sealing device being rearwardly located between the sleeve and the outer body, the sleeve being rearwardly urged by a pressure spring, and means in the outer body for locking and releasing the sleeve.

2. The coupling according to claim 1, wherein the sleeve has on its outer surface a circumferential groove; wherein the outer body has, in a position corresponding to the groove of the sleeve, a plurality of radial through holes which movably house a ring of balls; wherein around the outer body is a slidable rear collar enclosing the ring of balls with an internal circumferential groove; wherein the rear collar is rearwardly stressed by a thrust spring; and wherein an extension of the front collar acts as a stop shoulder for the rear collar.

3. The coupling according to claim 2, wherein the internal circumferential groove of the rear collar has a trapezoidal cross-section.

4. The coupling according to claim 2, wherein the outer body has a bearing shoulder for the spring of the rear collar.

5. The coupling according to claim 2, wherein the circumferential groove on the sleeve forms an arc of a circle in cross-section, and wherein the groove has a depth less than the diameter of the balls.

6. The coupling according to claim 1, wherein the sleeve has a tubular extension which slides inside the outer body.

7. The coupling according to claim 1, wherein the sleeve has an inner thrust shoulder for the spring.

8. The coupling according to claim 1, wherein the outer body has an inner thrust shoulder for the spring of the sleeve.

9. The coupling according to claim 1, wherein a rear end of the sleeve has an upper surface that contains a circumferential groove housing an O-ring seal.

10. The coupling according to claim 1, wherein the sleeve has an inner thrust shoulder for a spring for the outer slider.

* * * * *